(12) United States Patent
Kakei

(10) Patent No.: US 8,033,730 B2
(45) Date of Patent: Oct. 11, 2011

(54) LINEAR MOTION GUIDE UNIT WITH ROLLERS

(75) Inventor: Shigeki Kakei, Gifu-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 702 days.

(21) Appl. No.: 12/127,748

(22) Filed: May 27, 2008

(65) Prior Publication Data

US 2008/0298729 A1   Dec. 4, 2008

(30) Foreign Application Priority Data

May 25, 2007   (JP) ................................. 2007-138867

(51) Int. Cl.
*F16C 29/06*   (2006.01)
(52) U.S. Cl. .......................................... 384/44; 384/45
(58) Field of Classification Search .................... 384/15, 384/43–45, 49, 50, 55
See application file for complete search history.

(56) References Cited

U.S. PATENT DOCUMENTS

| | | | | |
|---|---|---|---|---|
| 4,634,295 A | * | 1/1987 | Agari | 384/44 |
| 7,677,804 B2 | * | 3/2010 | Geka et al. | 384/45 |
| 2005/0157962 A1 | * | 7/2005 | Matsumoto | 384/44 |
| 2006/0034552 A1 | * | 2/2006 | Nakano | 384/45 |

FOREIGN PATENT DOCUMENTS

| | | |
|---|---|---|
| JP | 200046052 | 2/2000 |
| JP | 2004138193 | 5/2004 |
| JP | 2005273765 | 10/2005 |

* cited by examiner

*Primary Examiner* — James Pilkington
(74) *Attorney, Agent, or Firm* — Browdy and Neimark, PLLC

(57) ABSTRACT

A linear motion guide unit with high stiffness, high accuracy and long-lasting service life is provided in which a rolling element is a roller and a carriage of a slider is made long to allow a crowning profile to be long. The carriage has an overall length equivalent to substantially four times a width of a guide rail. The carriage is made thereon with a raceway surface that is modified near lengthwise opposite ends thereof crowning profiles each of which has a crowning length equivalent to four times as long as a diameter of the roller and also has a crowing depth equivalent to an amount of elastic deformation that occurs in the raceway surfaces and the roller when the slider undergoes a load reaching a half of a static nominal standard load.

6 Claims, 7 Drawing Sheets

LINEAR MOTION GUIDE UNIT WITH ROLLERS

FIELD OF THE INVENTION

The present invention relates to a linear motion guide unit comprised of a guide rail with raceway grooves, and a slider that fits over or conforms to the guide rail to move lengthwise along the guide rail by virtue of more than one roller.

BACKGROUND OF THE INVENTION

Linear motion guide units have been extensively used in recent years with installed in the relatively sliding parts in machinery including machine tools, semiconductor fabricating instruments, measurement equipment, assembling machines, and so on. The linear motion guide units diverse in their sizes and types have been developed into commercial products for a variety of needs or applications. Among the linear motion guide units of the sort balls are selected as rolling elements, there have been developed the slider, especially carriage with a variety of crowning profile.

In a commonly-owned Japanese Laid-Open Patent Application No. 2005-273,765, there is disclosed a linear motion guide unit in which a carriage was machined to crown the race profile. With the prior linear motion guide unit as stated earlier, the raceway surfaces grooved in the carriage for the load-carrying races are machined at their ingress/egress areas to crown the raceway surfaces to modify the load-carrying race profile into the crowning profile of gentle curvature, and further made at their forward and aft ends with rounded bevels, one to each end, each of which is made in a curved contour merging into the associated crowning profile without causing any discontinuity at a junction or boundary of the rounded bevel with the crowning profile. The crowning profile extends across a length as twice as the diameter of a rolling element. Moreover, the crowing profile is made on the carriage to have a depth set to an equivalent of an amount of elastic deformation that might occur in the raceway surface when the load-carrying race undergoes the load reaching a half of a static nominal standard load. The crowning profile is worked out simultaneously with the raceway surface on the carriage, so that the crowning profile is made to merge evenly into the associated raceway surface.

Another linear motion guide unit is disclosed in Japanese Laid-Open Patent application No. 2000-46,052, which is better resistant to any impact or shock, effective to contain any vibration caused owing to rolling movement of the rolling elements and to keep the rolling elements against wobbling motion during rolling traveling, and further made less in variation in frictional resistance. This prior liner motion guide unit is composed of a guide rail and a slider that fits over or conforms to the guide rail for movement relative to the guide rail, the slider being made up of a carriage, end caps and more than one rolling element. The carriage is made to have the overall length of 20 to 50 times as long as the diameter of the rolling element. The prior art is considered to be only the linear motion guide unit having the slider greater in length than ever known.

A further another linear motion guide unit is disclosed in Japanese Laid-Open Patent application No. 2004-138,193, in which an area to crown the race profile is defined to reduce any wobbling motion of the rolling elements, which would occur when they rolled through the load-carrying races. The linear motion guide unit is composed of a guide rail having raceway surfaces, a slider having raceway surfaces in opposition to the raceway surfaces on the guide rail and conforming to the guide rail for linear movement along the raceway surfaces on the guide rail, and more than one rolling element interposed between the opposite raceway surfaces on the guide rail and the slider to roll through there. The raceway surfaces inside the slider are made slope at particular areas near their lengthwise ends to provide crowning profiles there. The interrelations among the effective length of a crowning profile, Lce, the overall length of the crowning profile, Lc, the diameter of a rolling element, Da, and the length of a bevel, C, are referred to Lce/Da$\geq$1 and also (Lc−C)/Da$\leq$3. With the linear motion guide unit as stated just earlier, the crowning profile in length is needed to at least satisfy Lc/Da<3.

Besides being able to work with high accuracy, for example high accuracy of submicron (a ten-thousandth mm) level in traveling performance and position control, the linear motion guide units to be used in a variety of machines including machine tools, semiconductor fabricating equipments, measurement instruments, assembling machines, and so on are needed to have high rigidity or stiffness sustainable against heavier machinery or large-sized work.

With the linear motion guide units installed in the machinery as stated earlier, conventional practice is to crown the raceway surface in the carriage and modify the raceway profile as recited earlier to make sure of high accuracy and high stiffness of the load-carrying races in the carriage of the slider. In the linear motion guide unit disclosed in the commonly-owned Japanese Laid-Open Patent Application No. 2005-273,765 as recited above, the crowning made on the carriage extends across twice as long as the diameter of the rolling element. Nevertheless, the crowning length made as stated just above was later proved insufficient for the carriage that is made extremely large in length, called ultra-long type to make certain of the stiffness or rigidity.

With the prior linear motion guide unit as recited second, although the carriage in the slider is seemed made larger in length, it is unknown whether the construction renders the slider substantially viable. Moreover, the linear motion guide unit as recited third is of the type in which the balls are selected as rolling elements. The crowning profile extends at longest across about a matter of one to three times the diameter of the ball. Any further crowing is described to be refrained because of making the rigidity or stiffness less. The third prior art recited as stated earlier discloses no technical concept of the crowing length across four times or more the diameter of the rolling element and therefore is insufficient for the machinery that expects high stiffness as well as high accuracy of the linear motion guide units. Thus, it still remains a major challenge to develop the linear motion guide unit, which is high in both the accuracy and stiffness performances and further rich in durability or long-lasting service life when used in the machinery including machine tools, semiconductor fabricating equipment, measurement instruments, assembling machines, and so on.

SUMMARY OF THE INVENTION

The present invention, therefore, has as its primary object to overcome the problem as described just above and to further develop the linear motion guide unit disclosed in the commonly-owned senior Japanese Patent Application as stated earlier so as to befit for a slider, called for ultra-long type, in which a carriage is made extremely large in length. More particular, the present invention provides a linear motion guide unit of the type whose rolling elements are of rollers, in which a crowning profile is made in length as longer as viably permitted to ensure effectively any desired performances and correspondingly made in depth as deeper as viably permitted.

The present invention is concerned with a linear motion guide unit; comprising a guide rail having a first raceway surface extending lengthwise thereof, and a slider that fits over or conforms to the guide rail for movement relatively to the guide rail by virtue of more than one rolling element, the slider being composed of a carriage made therein with a second raceway surface lying in opposition to the first raceway surface of the guide rail to define a load-carrying race between them and further made therein with a return passage extending in parallel with the second raceway surface, end caps secured on opposite ends of the carriage, one to each end, and made therein with turnaround passages to connect the load-carrying race with the return passage, and more than one rolling element allowed to roll through a circulating circuit made up of the load-carrying race, return passage and the forward and aft turnaround passages;

wherein the rolling element is a roller, the carriage has an overall length equivalent to substantially four times a width of the guide rail, and the second raceway surface on the carriage is made to have near lengthwise opposite ends thereof crowning profiles each of which has a crowning length equivalent to 4±0.5 times as long as a diameter of the roller and also has a crowing depth equivalent to an amount of elastic deformation that occurs in the first and second raceway surfaces and the roller when the slider undergoes a load reaching a half of a static nominal standard load.

In one aspect of the present invention, there is disclosed a linear motion guide unit in which the crowning profile is worked to have a curved contour where the radius of curvature is kept constant across the crowning profile, and further the crowning profile is worked simultaneously with the even area in the raceway surface other than the crowning profile to merge evenly into the raceway surface.

In another aspect of the present invention, a linear motion guide unit is disclosed in which bevels of rounded contour are made between the lengthwise end surfaces of the carriage and their associated terminals of the crowing profiles so as to get edgewise areas merging into their associated end surfaces of the carriage without causing any discontinuities between them.

In another aspect of the present invention, a linear motion guide unit is disclosed in which the guide rail has bolt holes that are positioned lengthwise at regular intervals, and further in which a pitch between successive bolt holes is set in a way three to four bolt holes conform to a distance across an overall length of the slider.

In another aspect of the present invention, a linear motion guide unit is disclosed in which the carriage is made with nine threaded holes in all, which are arranged in geometry that every three threaded holes are positioned at regular intervals lengthwise in a row while every row of three threaded holes is spaced at regular intervals crosswise away from each other.

In a further another aspect of the present invention, there is disclosed a linear motion guide unit in which the carriage 3 is made in an ultra-long type that is from 6.3 to 8.3 times as long as a length of the end cap 4 in moving direction of thereof.

The linear motion guide unit constructed as stated earlier is composed of a guide rail including a guide shaft, and a slider that fits over or conforms to the guide rail for sliding movement relative to the guide rail through more than one roller for a rolling element. The linear motion guide unit is befitted for the roller type in which the rollers roll in circulating manner inside the slider. With the linear motion guide unit of the present invention, the carriage is made longer in sliding or moving direction than the prior long type to make it possible to extend the crowning profile to the crowning length equivalent to four times the diameter of the roller thereby accomplishing high stiffness, high accuracy and high durability to meet a diversity of demands once thought. The crowning profile having the curved contour constant in the radius of curvature across the crowning profile is easy to work and effective in long-lasting service life of the slider, even though the entrance and exit at the opposite ends of the load-carrying race are extremely minor compared with the major raceway surface else of the carriage.

DETAILED DESCRIPTION OF THE PREFERRED EMBODIMENTS

Figure 1:
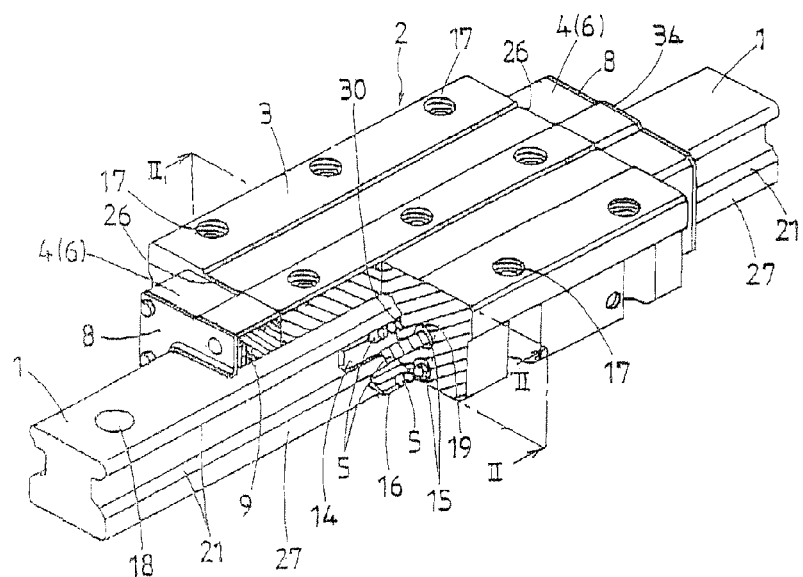
FIG. 1 is a perspective view, partially broken away, showing a preferred embodiment of a linear motion guide unit in accordance with the present invention.

The linear motion guide unit constructed according to the present invention is adapted for extensive use in a relative sliding system of a variety of machinery including machine tools, semiconductor fabricating equipment, precise measurement instruments, and so on, which looks increasingly for high traveling accuracy as well as high durability even under high-speed, high-acceleration/high-deceleration operational environment. With the linear motion guide units of the type recited earlier, it has been universally known the longer the carriage in the slider is made, the better it is for high accuracy as well as high stiffness. In light of conventional practice the carriages relatively long have been preferably selected for high stiffness and high accuracy in the linear motion guide units, the present invention is envisaged the provision of a carriage made further extensive in length, called ultra-long type, to fit much higher stiffness and accuracy levels needed for the linear motion guide units.

A preferred embodiment of the linear motion guide unit according to the present invention will be hereinafter described with reference to the accompanying drawings.

The linear motion guide unit of the present invention is of the roller-type in which the rollers 5 are selected as rolling elements to make sure of sufficient stiffness or rigidity as well as high traveling accuracy. A carriage 3 is made more extensive in length than ever and correspondingly crowning profiles 10 at forward and aft ends of raceway surface 22 on the carriage 3 are each made in length as longer as viably permitted. Especially, with the linear motion guide unit stated in detail later, the carriage 3 for a slider 2 is extended in length L1 as long as efficiently permitted or equivalent to 4 times as long as a width W of a guide rail 1 for achieving high stiffness as well as high accuracy. Moreover, a crowing profile at an entrance into the raceway surface 22 in a circulating circuit 30 is made to have a crowning length Lc as long as efficiently permitted or equivalent to 4±0.5 (=3.5~4.5) times as long as a diameter Da of the roller 5 to realize high traveling accuracy. As an alternative, the linear motion guide unit of the present invention can be likewise applied to a guide shaft instead of the guide rail 1 whenever there is the roller type in which the rolling elements are made of the rollers 5, which are rich in stiffness for befitting to the relative sliding system of a variety of machinery including machine tools, semiconductor fabricating equipment, measurement instruments, assembling machines, and so on.

Figure 2:
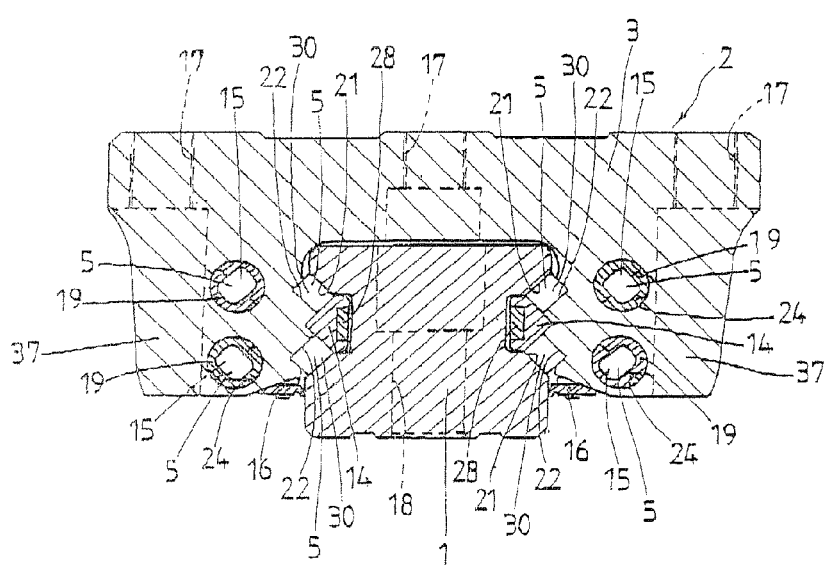
FIG. 2 is an enlarged view in transverse section of the linear motion guide unit of FIG. 1, taken on the plane of the line II-II of that figure.

The linear motion guide unit of the present invention as shown in FIGS. 1 and 2 is in general comprised of the elongated guide rail 1 inclusive of a guide shaft made on each lengthwise side 27 thereof with a pair of raceway surfaces 21 or first raceway surfaces, and the slider 2 that fits over or conform to the guide rail 1 in a way moving relatively to the guide rail 1 by virtue of more than one cylinder or roller 5. The slider 2 is mainly composed of a carriage 3 made thereon with raceway surfaces 27 or second raceway surfaces lying in opposition to the raceway surfaces 21 on the guide rail 1 to define load-carrying races 30 between opposite raceway surfaces 21 and 27 and further made therein with return passages 15 extending in parallel with the load-carrying races 30, forward and aft end caps 4 disposed on lengthwise opposing end surfaces 26 of the carriage 3 and further made therein with turnaround passages 25 to join the fore-and-aft load-carrying races 30 to their associated return passages 15, respectively, and more than one than one roller 5 allowed to roll through circulating circuits 35 each of which is made up of the load-carrying race 30, return passage 15 and a pair of turnaround passages 25

The linear motion guide unit of the present invention, moreover, includes end seals 8 secured on outward end surfaces 34 of the end caps 4, one to each end cap 4, to close clearances left between the guide rail 1 and the slider 2, retainer plates 14 lying lengthwise of the carriage 3 along their associated load-carrying races 30 in widthwise opposite to each other to keep in place the rollers 5, and lower seals 16 arranged underneath the bottom of the carriage 3 to close clearances left between the guide rail 1 and the slider 2. The end caps 4 are each made up of a major cap body 6, and a spacer part 7 that fits into a recess made in a particular surface of the major cap body 6, which faces toward the carriage 3. With the end cap 4 constructed as stated earlier, moreover, a recessed surface inside the major cap body 6 defines an outside curved half of the turnaround passage 25 while an outward surface around the spacer part 7 defines an inside curved half of the turnaround passage 25. The retainer plates 14 are bolted on the carriage 3 through fastening members 28. The return passage 15 made in the carriage 3 is defined with a sleeve 19 that fits into a lengthwise bore 24 made in the carriage 3.

Figure 3:
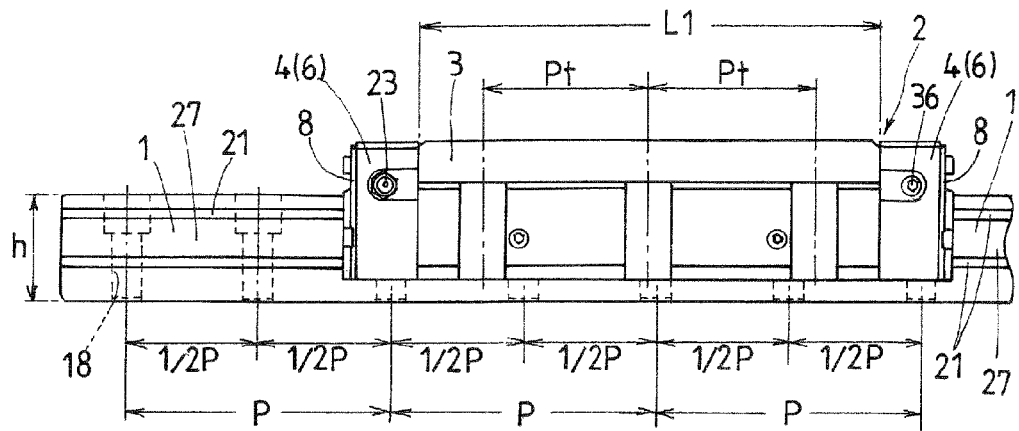
FIG. 3 is a view in front elevation of the linear motion guide unit of FIG. 1.
Figure 4:
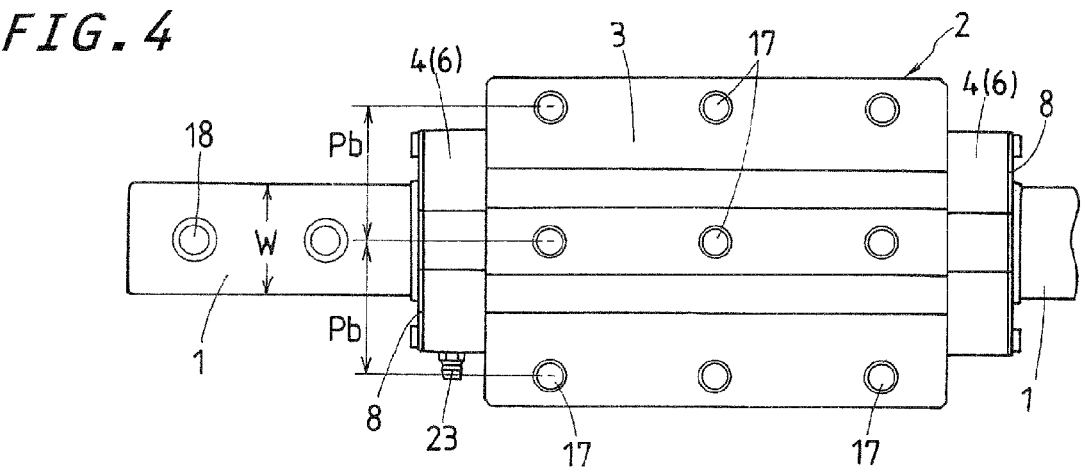
FIG. 4 is a view in plan of the linear motion guide unit of FIG. 1.
Figure 5:
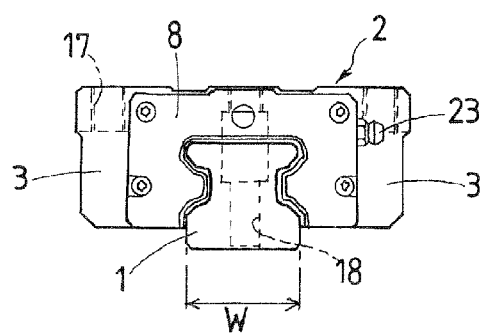
FIG. 5 is a view in side elevation of the linear motion guide unit of FIG. 1.
Figure 6:
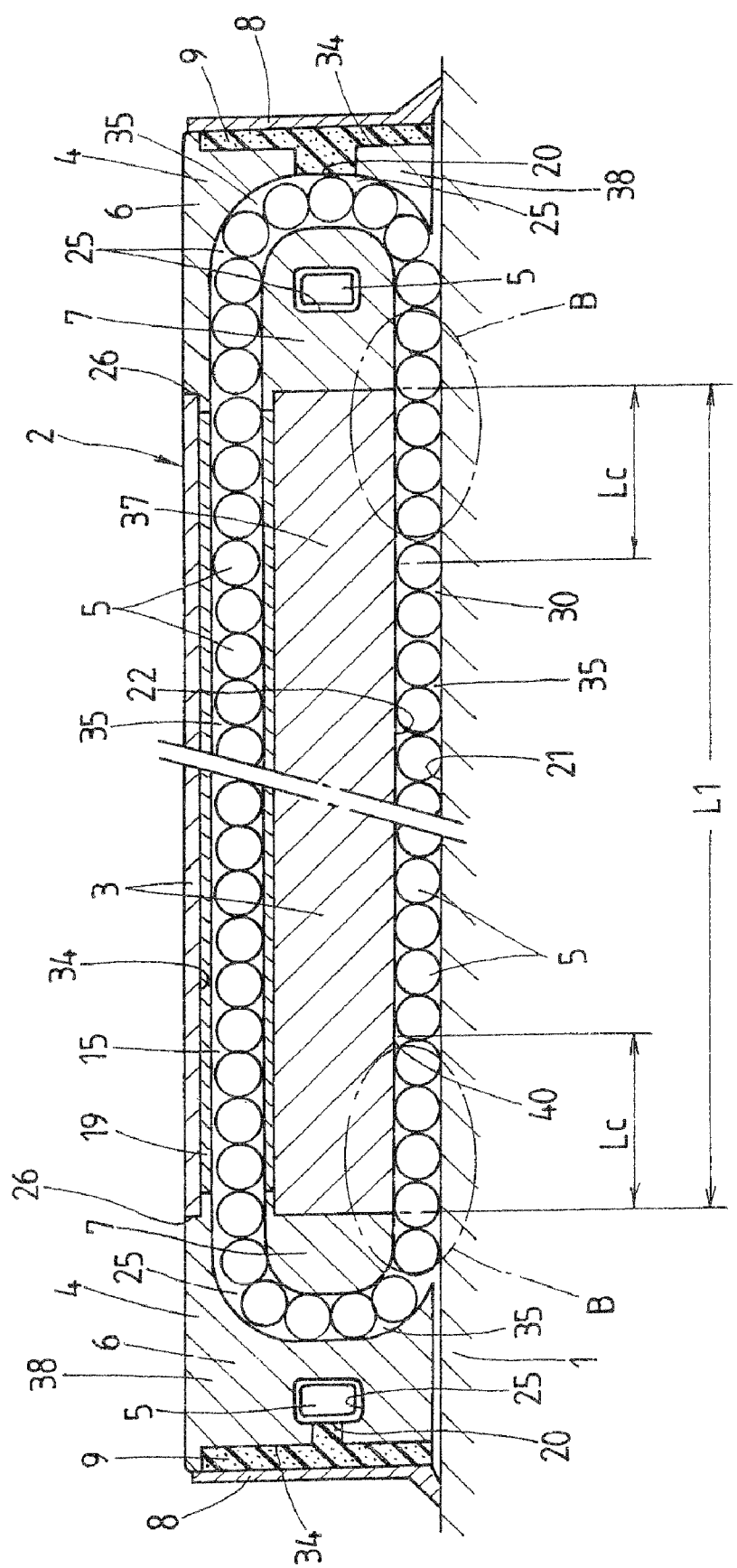
FIG. 6 is a schematic view in longitudinal section, partially broken away, illustrating a circulating circuit in the linear motion guide unit of FIG. 1.

In sidewise opposing bulgy portions 37, 38 of the carriage 3 and the end caps 4 joined together to provide the slider 2, there are provided paired circulating circuits 35, respectively, in such geometry as shown in FIG. 2. The rollers 5 rolling through one of the paired circulating circuits 35 are allowed to transfer from the downside race 30, carrying downward load because of the slider 2, into the associated upside return passage 10 in the carriage 3 in a circulating manner. In contrast, the rollers 5 rolling through the other of the paired circulating circuits 35 are allowed to transfer from the upside race 30, carrying upward load because of the slider 2, into the associated downside return passage 10 in the carriage 3 in a circulating manner. The turnaround passages 25 made in the end caps 4 are arranged to intersect one another in a fashion staggered one another in each of the sidewise opposing bulgy portions 38 of the end caps 4. As the rollers 5 in the linear motion guide unit constructed as stated earlier run through the load-carrying races 30 defined between the raceway surfaces 21 and 22 while subjected to heavy load, application of lubricant including grease, lubricating oil, and so on is inevitable to continue maintaining an adequate lubricant film between the load-carrying races 30 and the rollers 5 to keep them against metal-to-metal contact that might otherwise occur abnormal wear and scuffing. To cope with this, the end caps 4 as shown in FIGS. 3 to 5 have lubrication ports 23, one of which is connected with a grease nipple 23 to lubricate the load-carrying races 30, while the other not to be put to lubrication use is plugged with any closure 36. On the outward end surfaces 34 of the end caps 4 confronting with their associated end seals 8, there are installed members 9 impregnated with lubricant to provide lubrication plates for lubrication system as shown in FIG. 6. The lubricant impregnated members 9 fit into openings 20 to be exposed to outside curved halves of the turnaround passages 25 made in the major cap bodies 6 to apply continuously an adequate amount of lubricant on the rollers 5 rolling through the turnaround passages 25, thereby making the linear motion guide unit virtually maintenance-free for lubrication.

Figure 7:
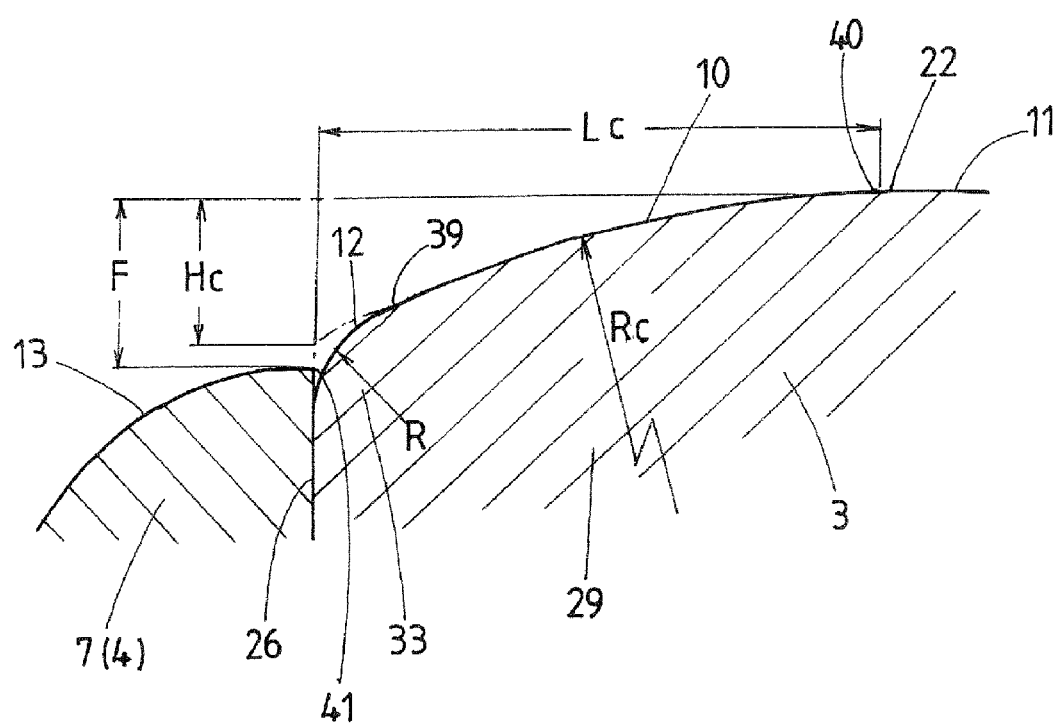
FIG. 7 is an enlarged fragmentary view in section showing in detail a particular portion encircled with a sign B in the circulating circuit of FIG. 6.

With the linear motion guide unit of the roller type in which the rollers are selected as the rolling elements, especially, the carriage 3 is made to have the overall length equivalent to 4 times the width W of the guide rail 1. Moreover, crowning profiles extending over forward and aft end-ward zones 29 of the raceway surface 22 is made to have a crowning length Lc as long as 4±0.5 (=3.5~4.5) times a diameter Da of the roller 5 and also have a crowning depth Hc equivalent to an amount of elastic deformation that might occur in the raceway surfaces 21 and 22 because of the rollers 5 when the load-carrying race 30 undergoes the load reaching a half (0.5 Co) of the static nominal standard load (referred as Co hereinafter). The crowning profile 10 is worked to have a curved contour where the radius Rc of curvature as shown in FIG. 7 is constant across the crowning profile 10. The crowning profile 10 is also worked simultaneously with the even area 11 in the raceway surface 22 other than the crowning profile 10 to merge evenly into the raceway surface 22.

With the linear motion guide unit constructed as stated earlier, bevels 12 of rounded contour are made across edgewise areas 33 of the forward and aft crowning profiles 10 so as to get the edgewise areas 33 merging into their associated end surfaces 26 of the carriage 3 without causing any discontinuities or discrepancies between them. The guide rail 1 has bolt holes 18, which are positioned lengthwise at such regular intervals that among the successive fastening holes 18, three to four fastening holes are covered with the carriage 3. In other words, the distance or pitch between successive fastening holes 18 arranged on the guide rail 1 is set to a half the pitch P universally selected for the guide rail 1, or ½ P=0.5P to make certain of fastening the guide rail 1 to any base with high accuracy as well as sufficiently high stiffness. With the linear motion guide unit as stated earlier, the fastening holes 18 are made on the guide rail 1 in a fashion the carriage of the overall length L1 fits over or conforms to the guide rail 1 across from 3 to 4 fastening holes 18. More specified in detail, the relation is defined as $3 \leqq L1/0.5P \leqq 3.5$. Moreover, the carriage 3 called ultra-long type is especially designed to have the overall length in the traveling direction, which is from 6.3 to 8.3 times as long as a length of the end cap 4 in the same direction. On the carriage 3, there are made nine threaded holes 17 in all, which are arranged in geometry that every three threaded holes are positioned at regular intervals lengthwise in a row while every row of three threaded holes is spaced at regular intervals crosswise away from each other.

Figure 8:
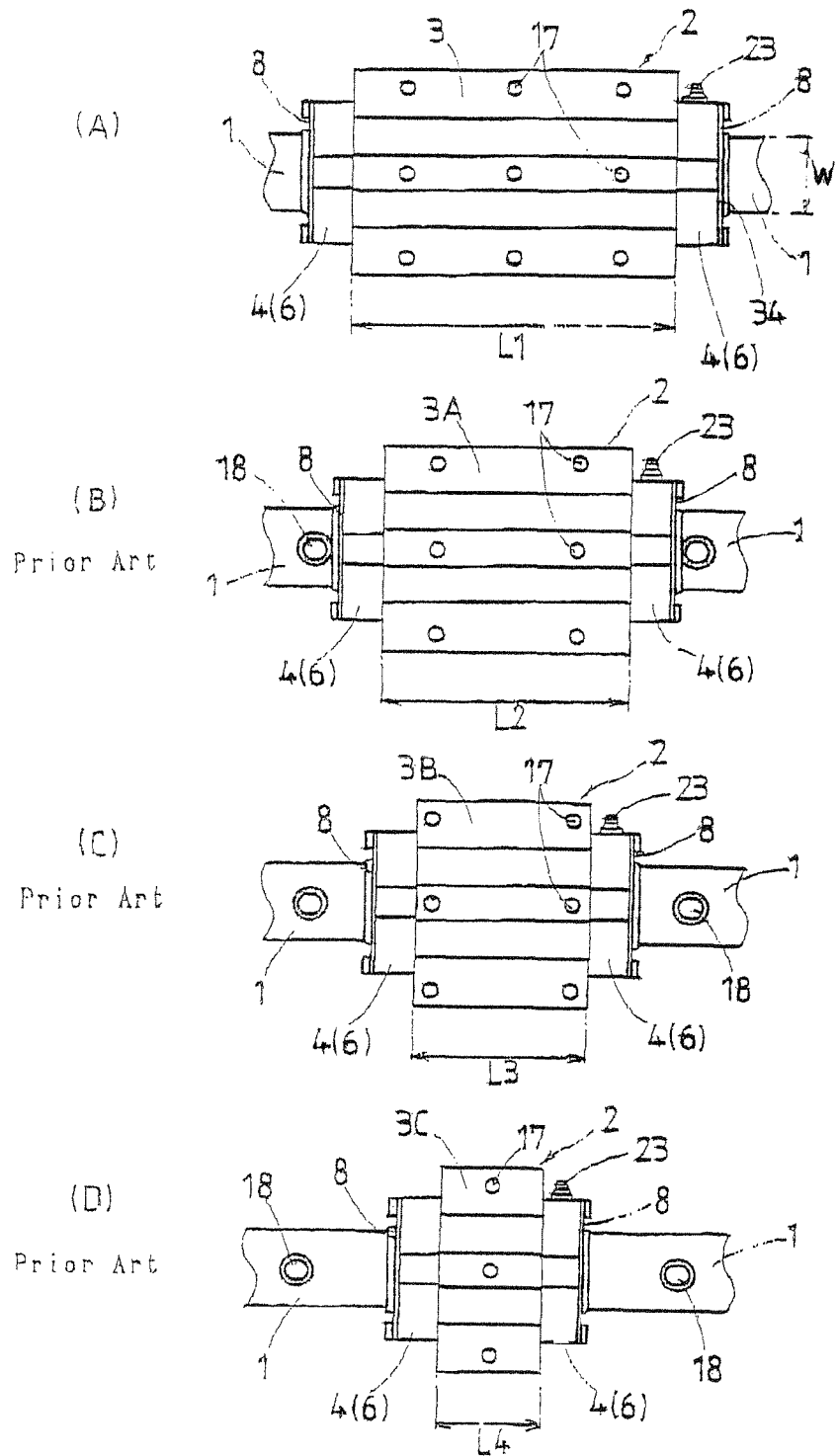
FIG. 8 is a view explanatory of the present invention compared with the prior art.

Referring now to FIG. 8, there is shown the linear motion guide unit constructed according to the present invention, compared with the prior art. In FIG. 8, the construction (A) illustrates the linear motion guide unit, called ultra-long type according to the present invention, whereas the construction (B) is a prior linear motion guide unit of relatively long type, the construction (C) is another prior linear motion guide unit of standard type, and the construction (D) is a further another prior linear motion guide unit of short type.

With the linear motion guide units as recited earlier, their carriages 3 are made in different lengths L1, L2, L3 and L4. The end cap 4 and end seal 8 inevitably remain the constant in the traveling direction of the slider irrespective of different types of the linear motion guide units to ensure the turnaround motion of the rollers 5 with smoothness. The guide rails 1 stay unvarying in their transverse dimensions of width W and height H throughout the different types of the linear motion guide units. With the conventional practice in the prior linear motion guide units, two types of carriages, or the relatively long carriage and the short carriage, are universally available to one of the standard carriages that are customized for the different guide rail 1. The conventional linear motion guide units has rollers different in size with different guide rails in transverse section, and are numbered for every different guide rails with nominal product series identified with the width W (mm) of the guide rail 1. Meanwhile, the end cap 4 varies in lengthwise dimension depending on different rollers 5 in size rolling through the turnaround passages 25, regardless of whether the carriage 3 is longer or shorter. Thus, categorization of the carriage 3 different in length can be made based on the length of the end cap 4. In other words, the carriage 3 called ultra-long type in the present invention is 1.8 times as long as the carriage of the conventional standard type, or 1.3 times as long as the conventional long type.

The construction (C) in FIG. 8 shows the carriage of standard type having the length L3, which is around 4 times as long as the length of the end cap 4.

In the construction (D) in FIG. 8, the carriage is shown as having the length L4 made shorter than in the construction (C) of the standard type to be around 2.5 times as long as the end cap 4.

The construction (B) in FIG. 8 is of the long type in which the carriage is made in length L2 longer than in the liner motion guide unit of standard type (C). Especially, the length L2 of the carriage is made about 5.5 times as long as the length of the end cap 4.

In contrast, the construction (A) according to the present invention is called ultra-long type because of the carriage made longer of the length L1 than the carriage in the construction (B) of conventional long. Especially, the carriage is around 7.5 times in the length L1 as long as the length of the end cap 4, or from 6.3 to 8.3 times in the overall length as long as the end cap 4. In other words, the carriage constructed according to the present invention has the length L1, which is 1.8 times as long as the length L3 of standard type, 1.3 times as long as the length L2 of long type, 3 times as long as the length L4 of long type.

Referring back to FIG. 6, there is schematically shown the linear motion guide unit of the present invention. As the slider 2 moves in a sliding manner relatively to the guide rail 1, the rollers 5 roll through the circulating circuit 35 made up of the load-carrying race 30, forward and aft turnaround passages 25 and the return passage 15. Every time the roller 5 enters and/or exits the load area or load-carrying race 30, any elastic deformation occurs between the roller 5 and the raceway surfaces 21, 22. Moreover, the slider 2 comes under up-and-down variation and moment load every time the rollers 5 weighing on the load-carrying race 35 vary in number and in doing so undergoes complex posture variations of pitching, yawing and rolling. Extension in length L1 of the load-carrying race 30 or the carriage is considered to contribute toward reducing the variation rate overall the load-carrying race 30, making the posture variations of the slider 2 less thereby to raise the traveling accuracy of the slider 2. With the linear motion guide unit constructed as stated earlier, the longer the carriage is in length L1 shown in FIG. 6, the more the rollers 5 are in number. Nevertheless, the extension of the carriage is considered to entail major drawbacks of making frictional resistance against circulating rollers 5 more, and causing further variations in frictional resistance encountered when the slider 2 moves over the guide rail 1. Considering natural limits of precisions in machining the carriage 3 along with the drawbacks as stated just earlier, it is needed to define the length L1 of the carriage 3 considered as long as viably permitted.

With the design considerations as stated just earlier, the linear motion guide unit of the present invention features the carriage 3 made in length as long as permitted to render it viable.

With the linear motion guide unit of the present invention, particularly as shown in FIGS. 6 and 7, the carriage 3 has the raceway surface 22 thereon, which is formed at forward and aft end-ward zones 29 thereof with the crowning profiles 10 to make the traveling accuracy better. More particularly, the crowning profiles 10 are more extended in length Lc to raise accurate performance. Because of natural limits of precisions in machining the carriage 3, it is needed to define the length of the crowning profiles 10 considered as long as permitted to render them viable on machining process. With the linear motion guide unit of the present invention, according to the aspect of machining considerations as stated just earlier, the crowning profiles 10 made on the raceway surface 22 at forward and aft end-ward zones 29 thereof are defined to have the length Lc that is as long as permitted to render it viable.

Figure 9:
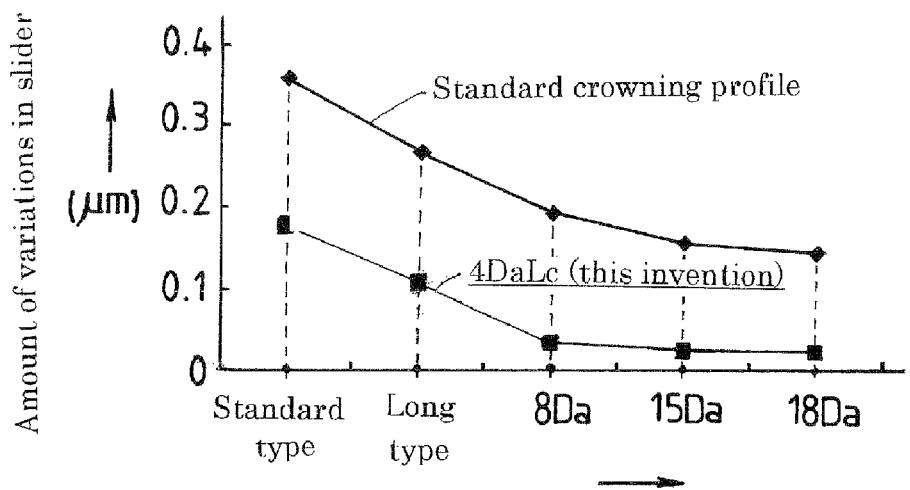
FIG. 9 is a graphic display of results given by analysis of amounts of variation in a slider constructed according to the present invention in comparison with the prior art.

Referring further to FIG. 9, there is shown analyzed results given to find what is considered optimal for the carriage 3. Finding the optimal length of the carriage 3 is to unravel how longer the carriage can be made as compared to the conventional long type illustrated in the construction (B). Specimens 1 to 5 of the carriage 3 were prepared for (a) the crowning profile of conventional standard length and (b) the crowning profile 10 of the present invention, respectively, which were both made on the raceway surface 22 cut in the carriage 3. The following table 1 shows amounts (μm) of variations caused in the sliders which were calculated to represent the up-anddown variations of the sliders 2 each of whose carriages was constituted with any one of the specimens 1 to 5 made thereon with either of the crowning profiles (a) and (b).

In Table 1, the crowning profile (a) was just the conventional crowning made slope on the carriage, while the crowning profile (b) was made by further extension of the crowning profile disclosed in the commonly-owned Japanese Patent Application as recited earlier to have the far elongated crowning length Lc. Especially, the crowning profile Lc made on the raceway surface 22 of the carriage 3 had the length of substantially 4 times the diameter Da of the roller 5, thus referred as 4DaLc.

TABLE 1

| Specimens prepared to test amounts (μm) of variations caused in the sliders | Standard slope crowning profile | Crowning profile extending across 4 DaLc |
|---|---|---|
| Specimen No.1: Standard type | 0.359 | 0.172 |
| Specimen No.2: Long type | 0.269 | 0.093 |
| Specimen No.3: 8 Da in the overall length The product of this invention | 0.194 | 0.050 |
| Specimen No.4: 15 Da in the overall length | 0.156 | 0.034 |
| Specimen No.5: 18 Da in the overall length | 0.144 | 0.029 |

In Table 1, the specimen No. 1 corresponds to the construction (C) of standard type in FIG. 8, the specimen No. 2 is the equivalent to the construction (B) of conventional long type in FIG. 8, the specimen parallels the carriage of 8Da in the overall length, the specimen No. 4 parallels the carriage of 15Da in the overall length, and the specimen No. 5 is the carriage of 18Da in the overall length.

(1) Specimen No. 3 is eight times the diameter Da of the roller 5 longer than the long type in FIG. 8 in the overall length; the product of this invention.

(2) Specimen No. 4 is fifteen times the diameter Da of the roller 5 longer than the long type in FIG. 8 in the overall length.

(3) Specimen No. 5 is eighteen times the diameter Da of the roller 5 longer than the long type in FIG. 8 in the overall length.

The amounts of variations caused in the slider were obtained using the slider in which there were made four rows of circulating circuits 30 as illustrated in FIG. 2. The amounts of variations in the slider were referred as variations at the center of the slider 2, which were calculated based on amounts of elastic deformation that might occur in four rows of the raceway surfaces 22 dependent on different formations and sequences of the rollers 5 in the respective circulating circuits 30.

As seen in Table 1 and the graphic representation of FIG. 9, the amount of variation in the specimen No. 3 of the overall length eight times 8Da the diameter of the roller 5 longer than the long type was 0.050 μm which was, even though a little high, almost equal with the amounts of 0.034 μm and 0.029 μm in the specimens Nos. 4 and 5, respectively. Thus, the slider 2 constituted with the specimen No. 3 was considered remained in good operating condition that is less in variation.

Even on working process, the carriage 3 of 8Da in length equivalent to the specimen No. 3 was more desirable in working efficiency than in the specimens Nos. 4 and 5 of 15Da and 18Da because the working efficiency got better as the carriage got less in the overall length. After especially investigating the crowning length of (b) 4DaLc, little distinction in amount of variations in slider could be made between the carriage of 8Da and other carriages of 15Da and 18Da longer than the 8Da. Considering an aspect of working the crowning profile 10 on the carriage 3, the carriage 3 of 8Da got remarkably better in economy of mass production, compared with other carriages of 15Da and 18Da longer than the 8Da. After practical use of experimental products, the specimen No. 4 of 15Da was found not to be usable as it got large in variations of sliding resistance at high velocity sliding motion (250 mm/sec), lacking the smoothness. According to investigations on the crowning length Lc worked actually, little distinction in wobbling motion unfavorable to rolling traveling can be made between three times 3Da the diameter Da of the roller 5 and five times 5Da the diameter Da of the roller 5 in crowning length. Even four times 4Da the diameter Da of the roller 5 was substantially identical with other different crowning lengths as recited earlier in wobbling motion unfavorable to rolling traveling. The investigations as stated earlier found that the most favorable crowning length Lc, while preferably made as long as possible, was four times 4Da the diameter Da of the roller 5, which was processed with no need of costly production requirements, using computer numerical control. Taking the tolerance into consideration, the crowning length Lc was determined as Lc=4Da±0.5Da, or 3.5~4.5 times the diameter Da of the roller 5.

After practical use of experimental products, the carriage 3 of 15Da in the overall length was found not to be usable as it got large in variations of sliding resistance at high velocity sliding motion (250 mm/sec) lacking the smoothness. While experimental product of the crowning length Lc=5Da was not viable, the Lc=4Da was the best. In FIG. 9, moreover, there is shown analysis result of nominal type number 35. The analysis results were as same for any other nominal type numbers as for nominal type number 35. With the linear motion guide unit of the present invention, it was found that the most preferable carriage had the overall length L1 eight times the diameter of the roller 5 longer than the long-type carriage L2.

The overall length L1 of the carriage 3 was 1.3 times as long as the overall length L2 of the long-type carriage, and eventually got four times in length as long as the nominal size. Especially, the carriage was made to have the dimension substantially four times the width W of the guide rail 1, which was about the same dimension as the nominal dimension.

The linear motion guide unit was designed, for example as shown in Table 2 in which dimensions are mm

TABLE 2

| Nominal: J (dim.) | 30 | 35 | 45 |
|---|---|---|---|
| W (width) (mm) | 28 | 34 | 45 |
| L1 (mm) | 119.4 | 138.6 | 179 |
| L2 (mm) | 91.4 | 106.6 | 139 |
| L1/L2 | 1.31 | 1.3 | 1.29 |
| L1/J | 4 | 4 | 4 |
| L1/W | 4.3 | 4.1 | 4 |
| Da (mm) | 3.5 | 4 | 5 |
| L1-L2/Da | 8 | 8 | 8 |

With the linear motion guide unit of the present invention, the crowning profile 10 made on the carriage 3 shown in FIG. 7 was designed as stated later to render the slider 2 as long as permitted. The linear motion guide unit of the present invention was constructed based on the crowning disclosed in the commonly-owned senior Japanese Patent Application as recited earlier. Especially, the crowning length Lc was made to extend across four times the diameter Da of the roller 5. FIG. 7 is an enlarged fragmentary view in longitudinal section of the raceway surface 22 of the carriage 3 to illustrate in detail the end-ward zone of the raceway surface 22 encircled with a sign B in FIG. 6. The crowning profile 10 and the bevel edge 12 of rounded contour, because of actually too tiny to recognize details on the raceway surface 22 with naked eyes, are illustrated with exaggeration in FIG. 7.

On the forward and aft end-ward zones 29 of the raceway surface 22 cut on the carriage 3 to provide the entrance and/or exit of the load-carrying race of the circulating circuit 30, there are made the crowing profiles 10 each of which curves gently and gets the bevel edge 12 of rounded contour to allow the rollers 5 to move in and out of the load-carrying flat surface 11 of the load-carrying race 30 with smoothness. The bevel edge 12 of rounded contour is made to merge into the associated crowning profile 10 with continuity through a boundary 39 between the crowning profile 10 and the associated bevel 12 that is rounded with no sharp edge. On the raceway surface 22 of the carriage 3, both the crowning profile 10 and the flat profile 11 are made simultaneously in a single working operation to provide the load-carrying race 30 continuing smoothly throughout there. In addition, the crowning profile 10 is made in a way merging evenly into the flat surface 11 of the load-carrying race 30 without causing any discontinuity at a location 40 where the crowing profile 10 occurs there. A curved surface of the crowning profile 10 is worked to have a curved profile where the radius Rc of curvature is constant when viewed perpendicularly in a transverse section of the load-carrying race 30. The crowning profile 30 cut on the carriage 3 has a crowning length that refers to a length Lc extending from the end surface 26 of the carriage 3 to a lengthwise terminal of the flat surface 11 of the load-carrying race 30. The crowning length Lc is made to extend across four times the diameter Da of the roller 5.

A depth Hc of the crowning profile 10 refers to a perpendicular difference between the starting location 40 of the crowning profile 10 where the flat surface 11 of the raceway surface 22 merges into the crowning profile 10 and an intersection of the crowing profile 10 with the end surface 26 of the carriage 3. A level F where the carriage 3 really comes into abutment against a spacer part 7 of the end cap 4 is deep below the crowning depth H to cause a difference 41 (F−Hc) in elevation. In order to relieve the difference 41, the lengthwise end of the raceway surface 22 is cut edgewise to make the rounded bevel 12, thereby conjoining smoothly the load-carrying race 30 with the associated turnaround passage. The crowning depth Hc is set to the equivalent of an amount of elastic deformation that might occur in the raceway surface 22 because of the rollers 5 when the load-carrying race 30 undergoes the load reaching a half (0.5 Co) of the static nominal standard load (referred as Co hereinafter). In other words, the crowning depth Hc corresponds to the total amount of elastic deformation occurring on both the raceway surface 22 and the roller 5. Here, the static nominal standard load Co refers to the load capacity that can carry the maximum allowable static load predetermined for the linear motion guide unit without incurring any obstacle for operation. With the linear motion guide unit of the roller type, the static nominal standard load Co is referred to a static load causing a bearing stress of a preselected level (=4000 MPa), which is measured at the middle of contact area where the rollers 5 come into contact with the raceway surface 22 under the maximum load.

In the nominal #35, especially, the crowning profile 10 was made to have the crowning length Lc of 16 mm and the crowing depth H of 0.0212 mm. With the tolerance of the crowning length Lc in mind, the crowning length Lc was set to Lc=4Da+0.5Da. In other words, the crowning length Lc was determined as 3.5~4.5 times the diameter Da of the roller 5. Further considering the tolerance of the crowning depth Hc, the crowning depth Hc was set to Hc=0.0053 Da±0.0020 Da.

As the crowning depth Hc was very tiny compared with the carriage 3 per se, the level F where the load-carrying race 30 comes into connection with a curved surface, or inward curved half surface of the turnaround passage 25, of the spacer part 7 inside the end cap 4 was below the crowning depth Hc with the positional tolerance of ±0.5 mm for the spacer part 7 in mind. To remove the difference 41 made for the reason stated earlier thereby to allow the rollers 5 moving in and out the load-carrying race 30 with smoothness, the lengthwise end 26 of the raceway surface 22 on the crowning profile 10 is cut edgewise to make the rounded bevel 12. The rounded bevel 12 was made curved surface with the radius of curvature R of at least not less than 0.1 mm when viewed in the perpendicular section.

With the linear motion guide unit constructed as stated earlier, the crowing profile 10 made on the load-carrying race 30 near the lengthwise ends 29 is compliant to the high accuracy at high-speed traveling operation and the long-lasting durability even under conditions of usage in high-speed, high-acceleration/high-deceleration operation.

Still referring to FIGS. 3 to 5 showing the linear motion guide unit of the present invention, the carriage 3 has the overall length L1 equivalent to 4 times as long as a width W of a guide rail 1 (L1=4×W). The crowning profile 10 is made gently curved across the crowning length Lc equivalent to four times the diameter of the roller 5 (Lc=4×Da). Thus, the linear motion guide unit of the present invention is made in the construction of super-high stiffness and super-high accuracy, which are far superior to the high stiffness and high accuracy ever known. With the linear motion guide unit of the present invention, moreover, the distance or pitch between successive fastening holes 18 made on the guide rail 1 as shown in FIG. 4 is set to a half the universal pitch P to make certain of fastening the guide rail 1 to any machine bad 32. Thus, the carriage 3 extends to fit over or conform to the guide rail 1 across four fastening holes 18. Referring back to FIG. 3, the carriage 3 conforming to three fastening holes 18 has the overall length L1 longer than 1.5P but shorter than 2P. In other words, the length L1 is substantially equal to around 2P minus the lengths of end caps 4. More specified in detail, the relation is defined as;

$3 \leq L1/0.5P \leq 3.5$, or $1.5P \leq L1/0.5P \leq 1.75$.

On securing the guide rail 1 to the machine bed 32 with fastening bolts, bolt tightening may cause any elastic deformation around the tightened areas on the guide rail 1. Such elastic deformation adversely affects the traveling accuracy of the slider 2. Meanwhile, it is found that the smaller the pitch P between successive fastening holes is, the better the traveling accuracy of the slider 2 gets. Nevertheless, if the pitch between successive fastening holes 18 is too short, more chores in working and assembly are needed to mount the guide rail to the machine bed 32. With the linear motion guide unit of the present invention, the pitch between successive fastening holes 18 set to a half (½P) the universal pitch P to get the carriage 3 to fit over or conform to the guide rail 1 across four fastening holes 18 makes the traveling accuracy of the slider 2 better. On the carriage 3 of the linear motion guide unit, moreover, there are made nine threaded holes 17 in all, which are arranged in geometry that every three threaded holes are positioned at regular intervals lengthwise in a row while every row of three threaded holes is spaced at regular intervals crosswise away from each other. The geometry of threaded holes 17 as stated earlier is effective to equalize the load across the whole slider 2, even if heavy object is mounted on the slider 2, thereby helping the slider 2 to travel or move with steadiness.

Figure 10:
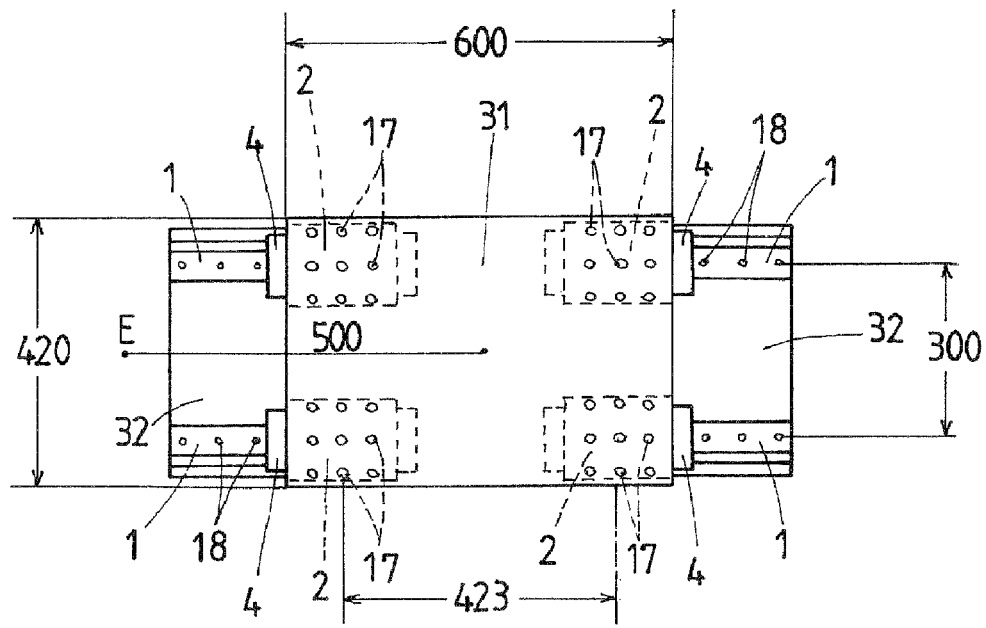
FIG. 10 is a plan view showing a measurement instrument to evaluate traveling accuracy of a table having incorporated with the linear motion guide units of the present invention.
Figure 11:
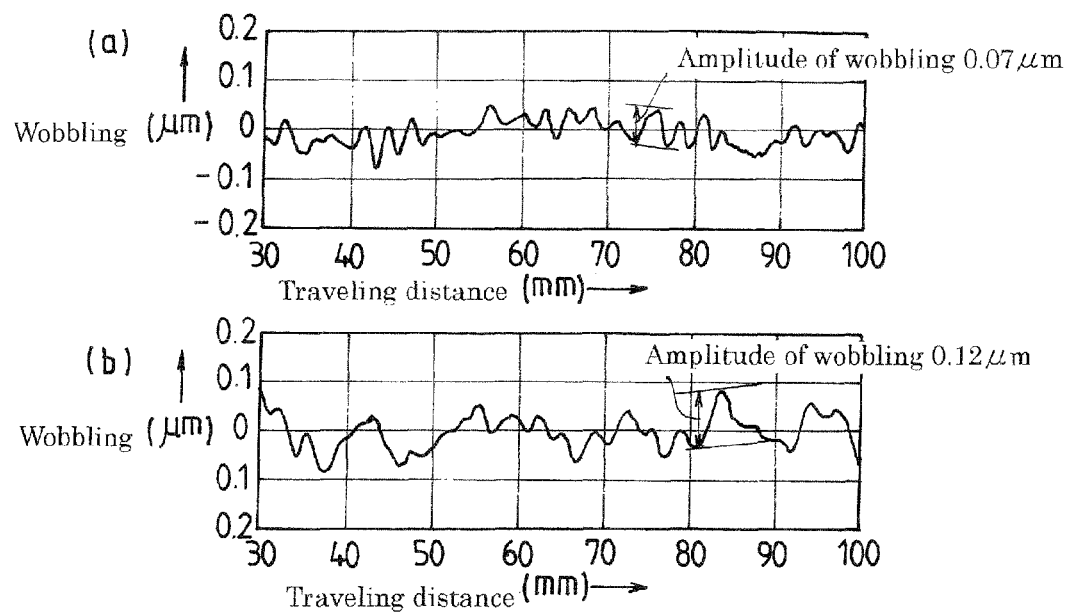
FIG. 11 is a graphic display of data given in the present invention by the measurement instrument of FIG. 10, as compared with the prior art.
Figure 12:
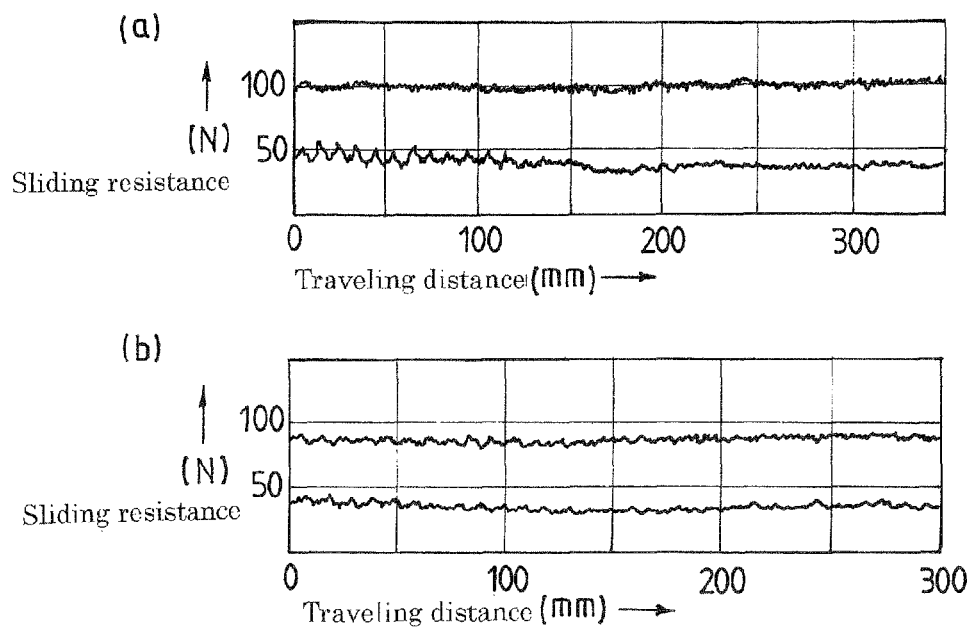
FIG. 12 is a graphic display showing sliding resistance encountered in the present invention, as compared with the prior art.

FIGS. 10 to 12 show test results measured really using the linear motion guide unit constructed as stated earlier. In FIG. 10, there is shown a testing equipment to measure the traveling accuracy of the table 31 in the table system having incorporated with the linear motion guide unit of the present invention. A pair of the guide rails 1 is secured on the machine bed 32 with dimensional relation as illustrated in FIG. 10. Two sliders 2 fit over the guide rail 1 in opposition to each other. In all, four sliders 2 bear the table 31 thereon. Wobbling in traveling occurring when the slider 2 slid was measured at a location E lying 500 mm away from the center of the table 31 in the sliding direction.

Still referring to FIG. 11, there is shown the results measured using the table system of FIG. 10 in terms of the vertical component of wobbling in traveling.

In (a), there is shown the result measured in the product of the present invention (nominal number: #45, prestressed pressure: T3 (0.08 Co of the static nominal standard load Co).

In (b), there is shown the result measured in the product of the prior long type (nominal number: #45, prestressed pressure: T3 (0.08 Co). The interval between the long-type carriages 3 was set to 463 mm.

As apparent from FIG. 11, it was found that the linear motion guide unit of the present invention was less in wobbling (μm) relative to the traveling distance (mm) and thus more improved in traveling accuracy than the prior linear motion guide unit of long type.

Turning now to FIG. 12, there is shown the measured result of sliding resistance when the slider 2 traveled in the horizontal.

In (a), there is shown the result measured in the product of the present invention (nominal number: #45, prestressed pressure: T3 (0.08 Co).

In (b), there is shown the result measured in the product of the prior long type (nominal number: #45, prestressed pressure: T3 (0.08 Co).

Still referring to FIG. 12, the top line of any pair is for the traveling velocity of 100 mm/sec while the bottom is for the traveling velocity of 10 mm.

As a result, it was found that the linear motion guide unit of the present invention was nearly constant relative to the traveling distance for both the different traveling velocities (10 mm/sec, 100 mm/sec), compared with the prior linear motion guide unit of long type and thus succeeded in much smooth sliding motion.

What is claimed is:

1. A linear motion guide unit comprising:
a guide rail having a first raceway surface extending lengthwise thereof, and a slider that fits over or conforms to the guide rail for movement relatively to the guide rail by virtue of more than one rolling element,
the slider being composed of a carriage having a second raceway surface lying in opposition to the first raceway surface of the guide rail to define a load-carrying race between the first raceway surface and the second raceway surface and
the slide further comprising a return passage extending in parallel with the second raceway surface,
end caps secured on opposite ends of the carriage, and the end caps comprising turnaround passages to connect the load-carrying race with the return passage, and
more than one rolling element allowed to roll through a circulating circuit made up of the load-carrying race, return passage and the turnaround passages;
wherein the rolling element is a roller, the carriage has an overall length equivalent to substantially four times a width of the guide rail, and
the second raceway surface on the carriage on the lengthwise end has crowning profiles each of which has a crowning length equivalent to 4±0.5 times as long as a diameter of the roller and also has a crowning depth equivalent to an amount of elastic deformation that occurs in the first raceway surface,
the second raceway surface and the roller when the slider undergoes a load reaching a half of a static nominal standard load.

2. A linear motion guide unit constructed as defined in claim 1
wherein the crowning profile has a curved contour where the radius of curvature is kept constant across the crowning profile.

3. A linear motion guide unit constructed as defined in claim 1
wherein bevels of rounded contour are at lengthwise end surfaces of the carriage.

4. A linear motion guide unit constructed as defined in claim 1
wherein the guide rail has bolt holes that are positioned lengthwise at regular intervals, and wherein a pitch between successive bolt holes is set in a way such that three to four bolt holes conform to a distance across an overall length of the slider.

5. A linear motion guide unit constructed as defined in claim 1
wherein the carriage is made with nine threaded holes in all, which are arranged in a geometry such that every three threaded holes are positioned at regular intervals lengthwise in a row while every row of three threaded holes is spaced at regular intervals crosswise away from each other.

6. A linear motion guide unit constructed as defined in claim 1 wherein the carriage is an ultra-long type that is from 6.3 to 8.3 times as long as a length of the end cap in moving direction of thereof.

* * * * *